United States Patent [19]
Weber

[11] 3,861,694
[45] Jan. 21, 1975

[54] QUICK-CHANGE CHUCK ASSEMBLY

[76] Inventor: Fritz Weber, Tittertenstrasse 17, Reigoldswil, Switzerland

[22] Filed: Nov. 12, 1973

[21] Appl. No.: 414,829

[30] Foreign Application Priority Data
Nov. 14, 1972 Switzerland.................. 016658/72

[52] U.S. Cl.................................. 279/79, 279/91
[51] Int. Cl.................................. B23b 31/04
[58] Field of Search............ 279/1 B, 1 Q, 9, 48, 56, 279/66, 69, 70, 79, 80, 82, 91, 103

[56] References Cited
UNITED STATES PATENTS
1,618,998   3/1927   Redinger............................. 279/91
2,869,883   1/1959   Dunbar................................ 279/56

*Primary Examiner*—Gil Weidenfeld
*Attorney, Agent, or Firm*—Karl F. Ross; Herbert Dubno

[57] ABSTRACT

A chuck body is formed with a backwardly tapered frusto-conical seat which receives an identically tapered portion of a chuck insert. The tapered portion of the insert lies just at the front face of the chuck body, and the insert is formed forwardly of this face with a forwardly tapered frustoconical portion. A nut threaded over the front end of the chuck body has a hole slightly larger than the maximum diameter of the insert between the portions, and this nut is formed in the hole with a forwardly tapered region of the same taper as the forwardly tapered portion of the insert. A split ring is received between these two forwardly tapered surfaces, and is engageable with the front face of the chuck body so that when the nut is screwed back on the body the ring is pushed forwardly by its front face and rides up on the two surfaces. This action compresses the ring to hold the insert in place.

9 Claims, 4 Drawing Figures

PATENTED JAN 21 1975
3,861,694
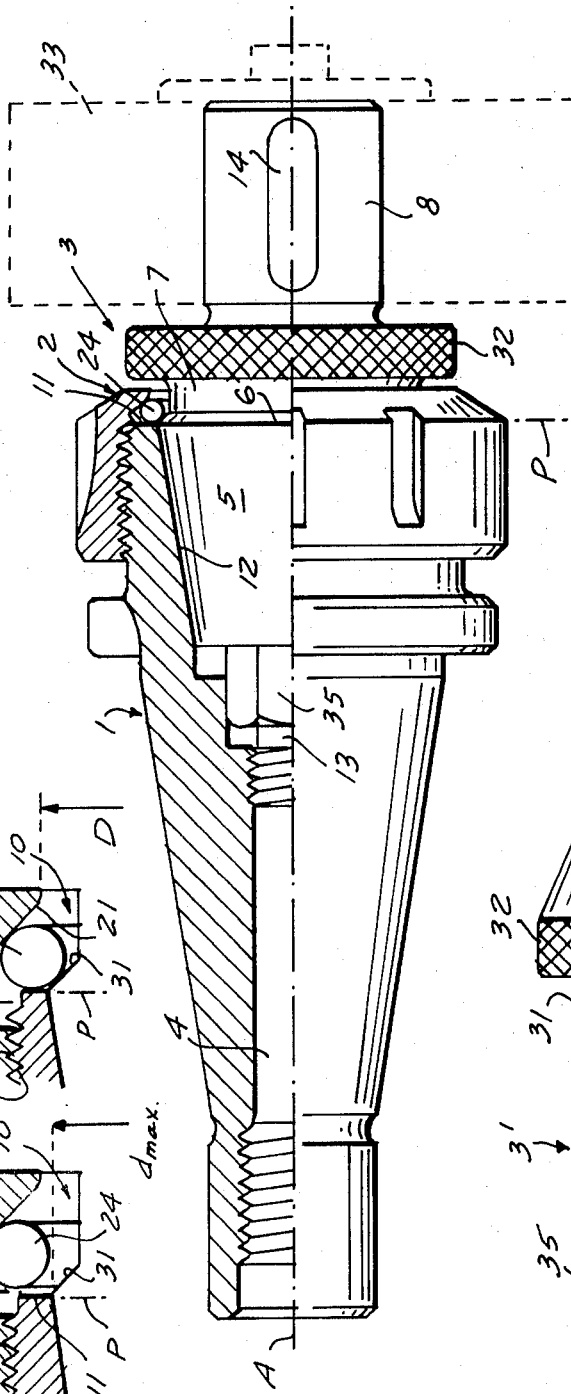
FIG. I
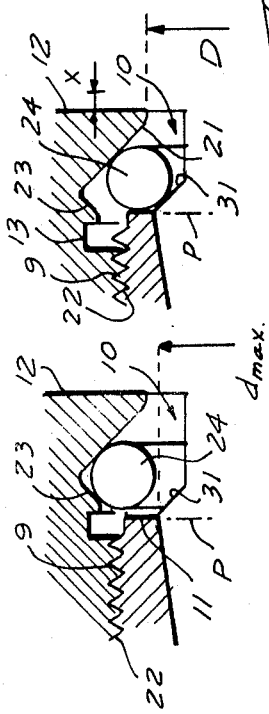
FIG. 3 FIG. 4
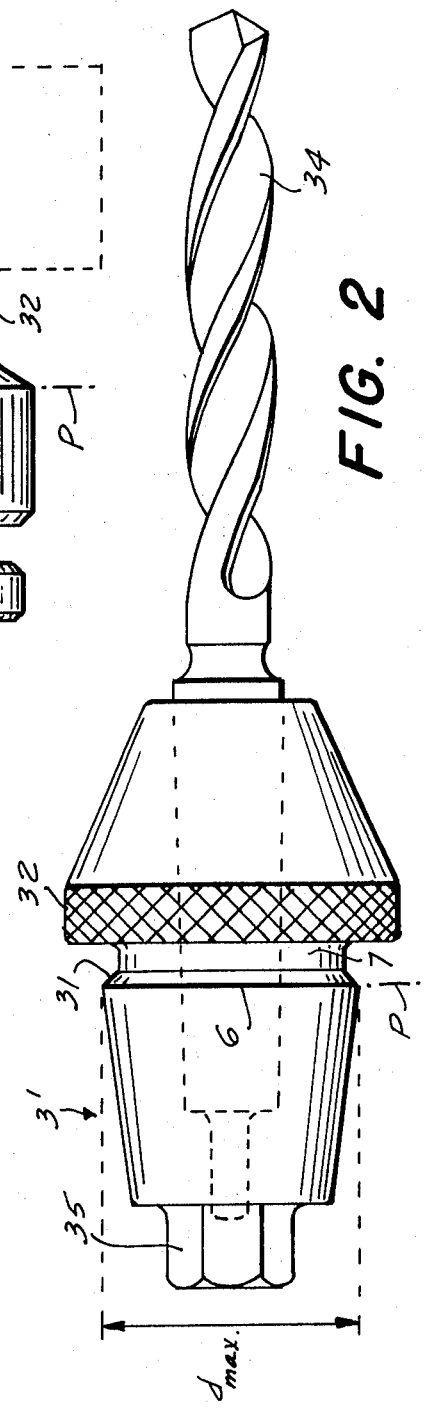
FIG. 2

QUICK-CHANGE CHUCK ASSEMBLY

CROSS-REFERENCE TO RELATED APPLICATION

This application is related to the commonly assigned and copending U.S. Pat. application Ser. No. 408,384 filed on Oct. 23, 1973 by Rolf Stohler and Ernst Gerber.

FIELD OF THE INVENTION

The present invention relates to a chuck assembly. More particularly this invention concerns such a quick-change chuck which is used in machining operations to hold tools or workpieces by means of inserts or collets.

BACKGROUND OF THE INVENTION

A chuck assembly usually comprises a chuck body formed with a forwardly open and backwardly tapered bore that receives a collet or insert having a backwardly tapered portion that is held in the bore by an annular nut that fits over the front end of the chuck body and pushes the front end of the insert back into the bore. The body is mounted on the spindle of a machining apparatus such as a mill, borer, lathe, drill, or the like. A tool or a workpiece is secured in or on the insert, which serves principally to insure that this tool or workpiece is correctly centered on the axis of rotation of the machine in question.

In order to change the insert in such a chuck it is necessary to completely remove the nut from the chuck body. This operation requires rotation of the nut through a multiplicity of revolutions and is therefore somewhat time consuming.

OBJECTS OF THE INVENTION

It is therefore an object of the invention to provide an improved collet chuck assembly.

Another object is the provision of such a chuck assembly which allows for the rapid and simple change of collets or inserts.

A further object is to provide such a quick-change chuck which is inexpensive to manufacture.

SUMMARY OF THE INVENTION

These objects are attained according to the present invention in a chuck assembly in which the collet or insert is formed such that the front edge of its backwardly tapered portion lies at the mouth of the bore of the chuck body when this insert is snugly received in the body, and the insert is formed forwardly of this edge with a forwardly tapered portion. The nut is formed in its hole with a forwardly tapered region that matches the corresponding region of the insert, and a split ring is received in the nut at this region. The hole through the nut is of large enough diameter to permit the collet or insert to pass through it. When tightened down on the chuck body, however, the split ring is pressed between the end of the chuck body and the forwardly tapered region of the nut, and is compressed thereby until it lies on the forwardly tapered portion of the insert. Thus the ring assumes an inner diameter which is smaller than the diameter of the insert at the plane separating the forwardly and backwardly tapered portions, so that this ring can retain the insert in place. Unscrewing of the nut allows the ring to expand until its inner diameter is large enough to permit the insert to be slipped out through it and through the ring.

In accordance with a further feature of this invention the insert is formed in front of its forwardly tapered region with a radially projecting collar having an outside diameter larger than that of the hole through the nut. This collar is spaced slightly ahead of the nut in the complete assembly so that if the nut is unscrewed it will engage the collar. Thus if the chuck insert becomes wedged in the chuck body, unscrewing of the nut will cause the nut to bear against the insert and force it loose, using the considerable mechanical advantage of the screw-threaded nut.

DESCRIPTION OF THE DRAWING

The above and other objects, features, and advantages of the invention will become more readily apparent from the following description, reference being made to the accompanying drawing in which:

FIG. 1 is a side view partly in section of an assembly according to the present invention;

FIG. 2 is a side view of a different type of chuck insert according to this invention; and FIGS. 3 and 4 are enlarged-scale views of a detail of FIG. 1 showing two different relative positions of the elements of the chuck assembly.

SPECIFIC DESCRIPTION

As shown in FIG. 1 the chuck assembly comprises a chuck body 1 having a bore 4 centered on an axis A and formed at its front end with a frustoconical seat 12 terminating at a front face 11 lying in a plane P orthogonal to the axis A.

An insert 3 is snugly receivable in this bore 4 and has a backwardly tapered region of the same degree of taper, 9°, as the seat 12 and shaped so that the front edge 6 of this frustoconical region 5 lies on the plane P. Forwardly of this edge 6 the insert is formed with a frustoconical region 31 lying at an angle of 45° to the axis A. Separated by a neck 7 from this region 31 is a collar 32 projecting radially out from the insert 2 and having an outside diameter substantially greater than the diameter $d_{max}$ of the insert 2 at edge 6. Further forward of the collar 32 is a pin 8 on which a milling tool as shown in dot-dash lines at 33 can be mounted with aid of a key or a shoulder 14.

The insert 3' of FIG. 2 is identical to that of FIG. 1 except that it is adapted to hold a drill bit 34 having a shank formed with a Morse taper. Both chuck inserts 3 and 3' are formed at their back ends with axially projecting hexagonal extensions 35 which are received in a similar hexagonal recess 13 in the bore 4 so as to prevent the insert from turning relative to the body 1.

A nut 2 formed with equispaced notches 25 permitting it to be rotated about axis A by a tool is formed with threads 9 that fit threads 22 on the body 1. This nut 2 has a hole 10 of a diameter D slightly greater than $d_{max}$ so that the insert 3 or 3' can be passed axially through it. Terminating at the front face 12 of this nut 2 at the mouth of its hole 10 is another frustoconical surface 21 having the same taper as the portion 31. This surface 21 terminates at its back edge in another frustoconical surface 23 tapered backwardly with the same angle of taper, 45°, as the surface 21. This surface 23 forms a shoulder in front of a notch 13 after which the threads 9 start.

A snap ring 24 of circular cross section is normally received as shown in FIG. 3 in the nut 2 between the surfaces 21 and 23 so that its inner diameter is greater than $d_{max}$. In this condition the insert 3 can be passed axially in and out of the bore 4 through the ring 24. When, however, the nut 2 is screwed axially back on the body 1 the ring 24 is pushed by the face 11 forwardly on the surface 21 to compress it and decrease its inner diameter to a size smaller than $d_{max}$ as shown in FIG. 4. In this condition the ring 24 rides up on the surface 31 of the chuck insert 3 so as to block this element tightly in place. Only one and one-half turns of the nut is necessary to displace this nut 2 through the distance $x$ sufficient to compress the ring 24 enough to lock the insert 3 in place.

The inserts 3 could be replaced by collets as described in the above-cited patent application, here however, the insert is removed from the body 1 by screwing the nut 2 out until its face 12 engages the collar 32, whereafter further screwing serves to loosen even the most tightly wedged insert 3.

I claim:
1. A chuck assembly comprising:
   a chuck body having a front face and formed with a bore terminating at said face and having a backwardly tapered seat;
   a chuck insert having a backwardly tapered portion snugly receivable in said seat and a forwardly tapered portion terminating at a back edge of predetermined diameter lying substantially at said front face with said insert received in said seat;
   a nut threadedly engageable over the front end of said body and having a throughgoing hole formed with a forwardly tapered region having a lesser inner diameter greater than said predetermined diameter of said insert, whereby said insert can pass through said hole, said region being spacedly juxtaposable with said forwardly tapered portion of said insert on screwing of said nut onto said body; and
   a split ring in said nut on said region and engageable with said front face and with said forwardly tapered portion, whereby, on screwing of said nut back on said body, said front face forces said ring forwardly on said forwardly tapered portion and region to compress said ring and lock said insert in said seat.

2. The assembly defined in claim 1 wherein said body, said nut, and said chuck insert are all centered on an axis and said bore, said portions, and said region are all at least partially frustoconical and centered on said axis.

3. The assembly defined in claim 2 wherein said nut is formed in back of said region with a shoulder, said ring lying between said shoulder and said region in an unmounted condition of said nut.

4. The assembly defined in claim 3 wherein said insert is forwardly of said forwardly tapered portion formed with a radially projecting collar having an outside diameter greater than the inner diameter of said region.

5. The assembly defined in claim 4 wherein said insert is formed at its back end with a backwardly extending projection of polygonal section and said body is formed in said bore with a socket snugly receiving said projection.

6. The assembly defined in claim 2 wherein said insert is formed at its front end with a forwardly projecting pin adapted to receive a tool.

7. The assembly defined in claim 2 wherein said forwardly tapered portion and said forwardly tapered region have the same degree of taper.

8. The assembly defined in claim 7 wherein said degree of taper is substantially 45°.

9. The assembly defined in claim 2 wherein said seat is formed with a taper of substantially 9°.

* * * * *